UNITED STATES PATENT OFFICE.

SIDNEY E. BRETHERTON AND FRANK L. WILSON, OF BERKELEY, CALIFORNIA.

PROCESS OF EXTRACTING METALS FROM THEIR ORES.

1,204,843.  Specification of Letters Patent.  Patented Nov. 14, 1916.

No Drawing.   Application filed December 23, 1912.  Serial No. 738,126.

*To all whom it may concern:*

Be it known that we, SIDNEY E. BRETHERTON and FRANK L. WILSON, citizens of the United States, and residents of Berkeley, county of Alameda, and State of California, have invented certain new and useful Improvements in the Process of Extracting Metals from Their Ores, of which the following is a specification.

The invention relates to a process of extracting metals of commercial value from their ores.

The object of the invention is to provide a process for the extraction of certain metals, such as zinc, cadmium, copper, nickel, cobalt and other commercially valuable metals from ores containing the same.

The invention possesses other advantageous features, which, with the foregoing, will be set forth at length in the following description where we shall outline in full the preferred method of carrying out the process. Any suitable apparatus may be used for carrying out the process and we do not desire to limit ourselves to any particular form thereof.

In accordance with our process, the ore, after it has been ground or pulverized to a suitable fineness and roasted or oxidized is subjected to the action of a liquor or solution containing ammonia and carbon dioxid, such action taking place under pressure.

An aqueous solution containing ammonia and carbon dioxid acts as a solvent upon the oxids, hydroxids, carbonates and sulfates of the above metals and when such solution and ores are mixed or brought in contact under pressure, the rapidity of the solvent action is greatly increased. By the use of this process the time of contact necessary for the profitable extraction of the above named metals is greatly reduced and the amount of ammonia - carbon dioxid solution consumed in dissolving the metals is greatly reduced.

The finely divided ore is charged into a suitable tank or receptacle and mixed with a suitable quantity of the solution and the tank is then sealed and pressure is introduced, generally by the introduction into the receptacle of air under pressure, so that the dissolving action takes place under pressure, which is preferably, though not necessarily maintained constant. The mixture of ore and solution may be subjected to agitation or the soluble constituents may be leached by percolation. The time of contact of the ore and solution necessary to produce the desired solvent action varies with various ores and may be readily determined by test or experiment.

The relative proportions of the two constituents of the solution may also vary with the ore being treated, and we have found that a particular ratio is not essential to the operation of the process. We have obtained good results with an aqueous solution containing 9% ammonia and 9% carbon dioxid on one ore and approximately equally good results with an aqueous solution containing 9% ammonia and 2% carbon dioxid on another ore. After the solution and ore have been in contact under pressure for the requisite time, the solution is separated from the remaining ore by suitable means and is conveyed through a closed conduit to the apparatus wherein the metals are precipitated or extracted from the solution.

The process is especially adapted for use in connection with zinc sulfid ores. In treating such ore, the ore after being pulverized, is subjected to an oxidizing or sulfatizing roast in which the zinc is converted into basic sulfates, approximately of the formula $ZnSO_4(x)ZnO$. The ore is then subjected to the action of the ammonia-carbon dioxid solution under pressure. It is practically immaterial whether the ore and solution are initially mixed under pressure or whether they are first mixed and then subjected to pressure. In this instance the ammonia will combine with the sulfate part of the basic sulfate and the carbon dioxid with the oxid constituent. The reaction is substantially as follows:

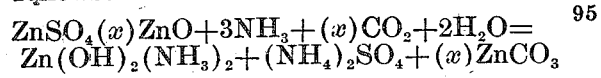

$$ZnSO_4(x)ZnO + 3NH_3 + (x)CO_2 + 2H_2O =$$
$$Zn(OH)_2(NH_3)_2 + (NH_4)_2SO_4 + (x)ZnCO_3$$

The zinc is then recovered by subjecting the solution to heat, which drives off the ammonia and excess carbon dioxid, which are collected and recovered, and the zinc is precipitated as a basic carbonate.

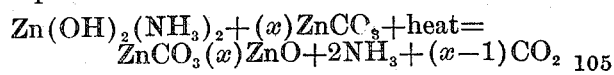

$$Zn(OH)_2(NH_3)_2 + (x)ZnCO_3 + heat =$$
$$ZnCO_3(x)ZnO + 2NH_3 + (x-1)CO_2$$

The basic carbonate is then filtered from the solution. The ammonia retained in the ammonia sulfate $(NH_4)_2SO_4$ solution is recovered by the addition of lime, as follows:

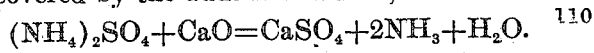

$$(NH_4)_2SO_4 + CaO = CaSO_4 + 2NH_3 + H_2O.$$

The solution may be formed by adding to the water, ammonium carbonate and free ammonia which will produce a solution containing ammonia and carbon dioxid or by adding ammonia and carbon dioxid to the water.

We claim:

1. The process of removing zinc from zinc sulfid ores, which consists in pulverizing the ore, roasting it to convert the zinc content into basic sulfates, then subjecting the roasted ore to the action under pressure of a solution containing ammonia and carbon dioxid which dissolves the zinc content, then heating the solution to precipitate the zinc as a basic carbonate and removing the precipitate from the solution.

2. The process of removing zinc from zinc ores, which consists in pulverizing the ore, subjecting the pulverized ore to the action under pressure of a solution containing ammonia and carbon dioxid which dissolves the zinc content, then separating the solution from the remaining ore, then heating the solution to precipitate the zinc as a basic carbonate and separating the precipitate from the solution.

In testimony whereof, we have hereunto set our hands at San Francisco, California, this 17th day of December, 1912.

SIDNEY E. BRETHERTON.
FRANK L. WILSON.

In presence of—
H. G. PROST,
P. S. PIDWELL.